United States Patent [19]

Benjamin et al.

[11] Patent Number: 4,592,771
[45] Date of Patent: Jun. 3, 1986

[54] METHOD OF PRODUCING DI-AMMONIUM PHOSPHATE FERTILIZER

[75] Inventors: Loftus A. Benjamin, Bathurst; Donald T. Aikens; Thomas B. Gravestock, both of Belledune; Herman Soehodho, Bathurst, all of Canada

[73] Assignee: Brunswick Mining and Smelting Corporation Ltd., Toronto, Canada

[21] Appl. No.: 645,263

[22] Filed: Aug. 29, 1984

[51] Int. Cl.⁴ .............................................. C05B 7/00
[52] U.S. Cl. ........................................ 71/34; 71/36; 71/43; 423/310
[58] Field of Search ................... 71/33, 34, 36, 43, 44; 423/310, 312

[56] References Cited

U.S. PATENT DOCUMENTS 4,211,546 7/1980 Jensen ..................................... 71/34

Primary Examiner—Ferris H. Lander
Attorney, Agent, or Firm—Schwartz, Jeffery, Schwaab, Mack, Blumenthal & Evans

[57] ABSTRACT

A novel method is provided to produce di-ammonium phosphate fertilizer by operating a DAP reactor and granulator in such a manner that part of the hot exhaust gases from the DAP reactor are diverted into a vaporizer where liquid ammonia is vaporized for use in the DAP reactor and the granulator. Considerable savings in energy and other advantages are achieved through such operation.

8 Claims, 1 Drawing Figure

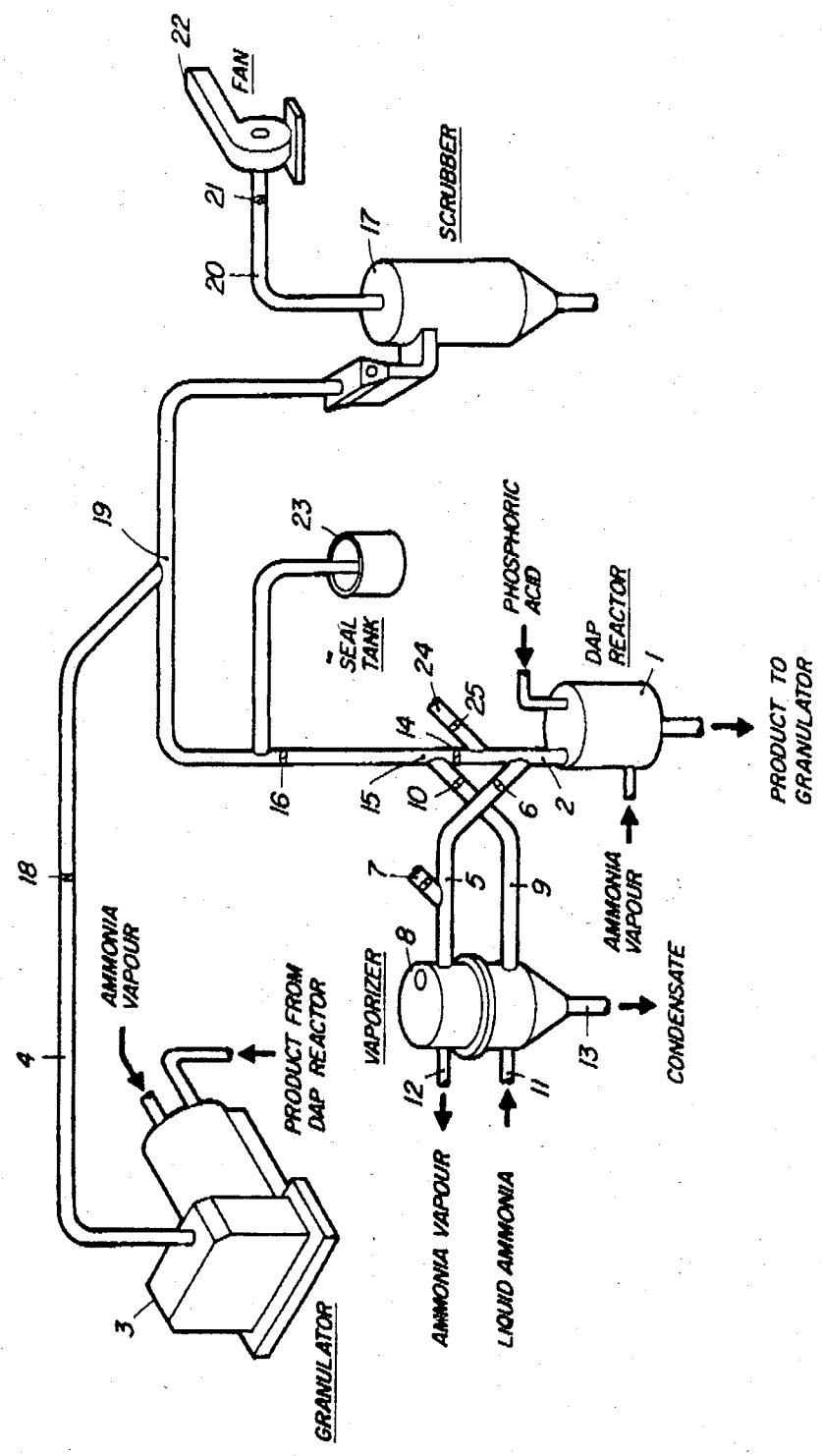

METHOD OF PRODUCING DI-AMMONIUM PHOSPHATE FERTILIZER

This invention relates to an improved method for producing di-ammonium phosphate fertilizer.

It is well known that di-ammonium phosphate fertilizer is most commonly produced by operating the di-ammonium phosphate reactor, known in the art as DAP reactor, where phosphoric acid is neutralized with ammonia vapour to a desired N/P ratio which is, however, less than 2, and the transformation to di-ammonium phosphate is completed in a granulator by adding the remaining ammonia requirement, in vapour form, to a rolling bed of recycled product and fresh reactor slurry. The ammonia vapour required for such DAP reactor and granulator system is produced in a vaporizer in which liquid ammonia is vaporized with steam and the flow of ammonia vapour for the process is controlled by changing the steam input to keep the gaseous phase at a predetermined pressure (in the order of 100–120 psig), while maintaining a uniform liquid ammonia level in the vaporizer.

In the DAP reactor, the heat generated by the exothermic reaction is dissipated with the hot exhaust gases. Such gases normally comprise a small proportion of N (about 5–6% by wt.), the remainder being $H_2O$ and air, with $H_2O$ comprising about 50–60% of the total. The gases exit at a temperature of about 190° F.–200° F. and are dissipated mainly as water vapour. These off-gases from the DAP reactor combine with the dust laden granulator off-gases and are then scrubbed with phosphoric acid and water before exhausting to the atmosphere.

It has already been suggested to utilize the heat of neutralization from the DAP reactor to evaporate water from the resultant solution to produce non-hygroscopic ammonium phosphate crystals. This method is described in Canadian Pat. No. 191,312 dated July 1, 1919. Such method, however, has not been accepted by the industry and is not being used in practice.

It is, therefore, an object of the present invention to provide a practical system wherein hot exhaust gases generated in the DAP reactor can be beneficially utilized.

It is another object of the present invention to utilize hot exhaust gases from the DAP reactor to vaporize ammonia required for the reactor and the granulator, thereby achieving substantial savings in energy and other advantages.

Thus, according to the present invention, a method is provided for operating a DAP reactor and granulator system which comprises: diverting part of the hot exhaust gases from the DAP reactor to a vaporizer in which liquid ammonia is maintained at a predetermined level; flowing said diverted gases through tubes in said vaporizer and controlling the flow thereof so as to continuously evaporate ammonia at a desired vapour pressure to supply the DAP reactor and the granulator, thereby also forming condensate in said tubes which flows out of the vaporizer; recombining the gases coming out of the vaporizer with the non-diverted gases from the DAP reactor and sending them to a scrubber and exhaust; and supplying the produced vaporized ammonia to the DAP reactor and the granulator at required rates.

Preferably, in accordance with the present invention, about 40% to 50% of the hot gases from the DAP reactor are diverted to the vaporizer and some air may be admixed therewith before inlet to the vaporizer. Such air has a stabilizing influence by reducing large fluctations in temperature of the incoming gases which sometimes can occur.

The liquid ammonia in the vaporizer is preferably maintained at a constant level, usually ranging between 30% and 50% of the heat exchange tube height, although this is by no means restrictive. This level can be at any desired height which is suitable to produce superheated ammonia vapour of required pressure, normally 100–120 psig, with the off-gas flow coming from the reactor. Also, although it has been found that it is preferable to maintain constant level of liquid ammonia in the vaporizer and vary the off-gas flow to achieve the desired pressure, this is not an absolute requirement since one can also vary the liquid level while maintaining a constant flow of exhaust gas through the vaporizer or both the off-gas flow and the liquid ammonia level can be varied and controlled so as to produce the desired pressure of vaporized ammonia to supply the DAP reactor and the granulator.

The off-gases usually enter the vaporizer at a temperature of about 190° F.–200° F. and exit at a temperature of about 170° F.–180° F., producing some condensate in the process. This condensate, which essentially consists of water with a little ammonia in it (about 2%–4%) can be reused as process water in the system. For example, the condensate can be used to wash the granulator off-gas dust and can be added to the reactor for control of specific gravity. This produces a small but significant saving in overall ammonia utilization and removes part of the nitrogen from the exhaust gases which otherwise would go into the atmosphere, thus providing an additional environmental benefit.

It should also be mentioned that, due to the method of the present invention, the recombined off gases are lighter than in the conventional process because a lot of excess water is condensed in the vaporizer. (In the applicant's system, about 25 gallons per minute of condensate is removed.) This in itself is a significant advantage because such lighter gases are easier to handle and exhaust as they impart less load on the fan required to blow such gases into the atmosphere, thereby allowing such fan to operate under less strain for a longer period of time while avoiding costly stoppages for repairs and other interruptions in the overall operation.

It is also preferable to direct the flow of exhaust gases in the vaporizer co-currently with the flow of the condensate. This helps to achieve a better removal of the condensate which normally flows by gravity, as well as to remove build up of scale in the tubes and improve the heat transfer coefficient of said tubes.

It should also be mentioned that, since the plant is normally shut-down at weekends, the vaporizer must initially heat up on steam, but after charging the DAP reactor with ammonia for about $\frac{1}{2}$ hour, there is enough heat available to switch to the off-gases and the steam is then entirely cut-off.

The invention will now be further described with reference to the appended drawing which illustrates the novel DAP reactor and granulator system operated in accordance with the present invention.

Referring to the drawing, phosphoric acid and vaporized ammonia are continuously fed at predetermined rates into DAP reactor 1 where phosphoric acid is neutralized with said ammonia by an exothermic reaction. In the specific case referred to herein, the neutralization proceeds until the mole ratio of 1.65 N/P is reached. Other mole ratios, such as 1.35 to 1.45 N/P can also be used. The reactor contents reach a temperature in the order of 225° F. and the reactor off-gases leave through duct 2 with a latent heat of around 20 million BTU per hour.

The neutralization product, which is in the form of a slurry, is discharged from the DAP reactor 1 and fed to granulator 3 where it is further reacted with additional ammonia vapour to produce di-ammonium phosphate granules. The off-gases from the granulator, laden with dust, are exhausted through duct 4.

Part of the exhaust gases from the DAP reactor 1 are diverted through conduit 5 by controlling the opening of damper 6. The hot exhaust gases, plus possible air bleed through port 7 to stabilize the heat input, enter vaporizer 8 and flow within a plurality of vertically disposed heat exchange tubes within said vaporizer and then exit through conduit 9 and re-join the non-diverted gases in duct 2. Damper 10 is provided to isolate the vaporizer 8 from the rest of the system if this becomes necessary. Liquid ammonia is introduced at 11 into the vaporizer so as to maintain a predetermined constant level thereof in the vaporizer which level is usually ranging between 30%–50% of the tube height and vapour ammonia leaves the vaporizer at 12 at a predetermined vapour pressure, which is normally between 100 and 120 psig, and is supplied to the DAP reactor 1 and the granulator 3 at required flowrates. The condensate, which is formed within the tubes, flows out of the vaporizer by gravity at 13. This flow of condensate is assisted by the flow of gases within the tubes in the vaporizer 8, which flow co-currently with the condensate. This also helps to keep the tubes free of scale and improves heat transfer. The tubes are preferably made of carbon steel, although other suitable materials could also be used. The condensate coming out at 13, which contains a small amount of ammonia (about 3%), can be used to wash the granulator off gas duct 4 which is done on a regular basis, and it can also be added to the DAP reactor 1 for control of specific gravity at a desired level (usually close to 1.5). Any excess condensate is discarded.

The off-gases from the DAP reactor 1 which have not been diverted to vaporizer 8, flow through duct 2 and the bypass damper 14, which is normally allowed to modulate, and these gases are re-combined with the gases coming out the vaporizer 8 through duct 9 at point 15 and flow through damper 16 to scrubber 17. Damper 16 is provided to control the pressure in duct 2 at the outlet of the reactor. For example, when this pressure increased beyond 3 inches water gauge vacuum, the reactor puffs and damper 16 is then opened slightly to control the pressure and stop the puffing.

The off-gases from the granulator 3 exhaust through duct 4 and damper 18 and join with the re-combined off-gases from the DAP reactor at point 19 and flow to scrubber 17. In scrubber 17, the gases are scrubbed with phosphoric acid and water before exhausting to the atmosphere through pipe 20, damper 21 and fan 22. It is fan 22 that provides the vacuum in the entire ducting system which, apart from pipe 20, is usually made of fiber reinforced polypropylene. Fan 22 is thus a very important piece of equipment which must operate efficiently and without many breakdowns. It produces a vacuum of $-30$ inches water gauge at the point where damper 21 is located and a vacuum of between $-5$ and $-7$ inches water gauge at point 19 and a vacuum of about $-3$ inches water gauge at the exit from the DAP reactor 1.

The seal tank 23 is a protection device to prevent collapse of the ducting system which is designed to withstand a pressure of 12 inches water gauge vacuumn. This could happen, for example, if damper 18 is inadvertently closed, which would substantially increase the vacuum in the ducting system. The seal tank, with the flow of water therethrough, would then pull air into the ducting system thereby preventing it from collapsing.

Also, if the fan had to be shut down or if, for other reasons, the gases from DAP reactor cannot be exhausted through the scrubber, then dampers 6 and 14 can be closed and the gases permitted to escape through conduit 24 and damper 25 into the dryer-cooler exhaust system. This is an additional safety feature provided herein.

The operation of the novel system, after a manual start-up on steam, can be carried out automatically with suitable instrumentation. Under normal conditions, the various damper positions would be as follows:

Damper 6—70% open
Damper 7—20% open
Damper 10—fully open
Damper 14—70% open
Damper 16—80% open
Damper 18—70% open
Damper 25—closed.

The above obviously represents only an example of a typical operation and is in no way limitative. The various damper or valve openings can be readily adjusted by those skilled in the art to provide the best conditions for their particular operation. The invention generally should not be limited by the specific embodiment described above and illustrated in the appended drawing but should include any modifications obvious to those skilled in the art.

The basic advantages of the invention can be summarized as follows:
1. Considerable fuel savings achieved through the use of DAP reactor off gases instead of steam to vaporize ammonia.
2. Removal of condensate from the system making the overall gases lighter and thus putting less load on the exhaust fan.
3. Removal of some ammonia with the condensate, thus sending less ammonia into the atmosphere.
4. Achieving a stable and efficient operation of the overall system.

These advantages are believed to produce a significant advance in the art of operating the DAP reactor and granulator systems.

We claim:
1. A method for operating a DAP reactor and granulator system, which comprises:
 (a) diverting part of the hot exhaust gases from the DAP reactor to a vaporizer in which liquid ammonia is maintained at a predetermined level;
 (b) flowing said diverted gases through tubes in said vaporizer and controlling the flow thereof so as to continually evaporate ammonia at a desired vapour pressure to supply the DAP reactor and the granulator, thereby also forming condensate in said tubes which flows out of the vaporizer;
 (c) recombining the gases coming out of the vaporizer with the non diverted gases from the DAP reactor and sending them to a scrubber and exhaust; and (d) supplying the produced vaporized ammonia to the DAP reactor and the granulator at required rates.

2. Method according to claim 1, in which about 40%–50% of the hot gases from the reactor are diverted to the vaporizer and some air is admixed therewith before inlet to the vaporizer.

3. Method according to claim 1, in which the liquid ammonia in the vaporizer is maintained at a constant level ranging between 30% and 50% of the tube height within the vaporizer.

4. Method according to claim 1, in which the flow of diverted gases and thus the heat input is controlled so as to continuously produce superheated ammonia vapour in the vaporizer under a vapour pressure of 100–120 psig.

5. Method according to claim 1, in which at least part of the condensate, which contains a small amount of ammonia in it, is reused as process water in the system.

6. Method according to claim 1, in which the gases enter the vaporizer at a temperature of about 190° F.–200° F. and exit at a temperature of about 170° F.–180° F.

7. Method according to claim 1, in which the flow of gases in the tubes within the vaporizer is co-current with the flow of condensate in said tubes.

8. Method according to claim 7, in which said tubes are made of carbon steel.

* * * * *